Feb. 2, 1926. 1,571,883
F. X. BÉLANGER
LAND CLEANING DEVICE
Original Filed Feb. 14, 1922 2 Sheets-Sheet 1
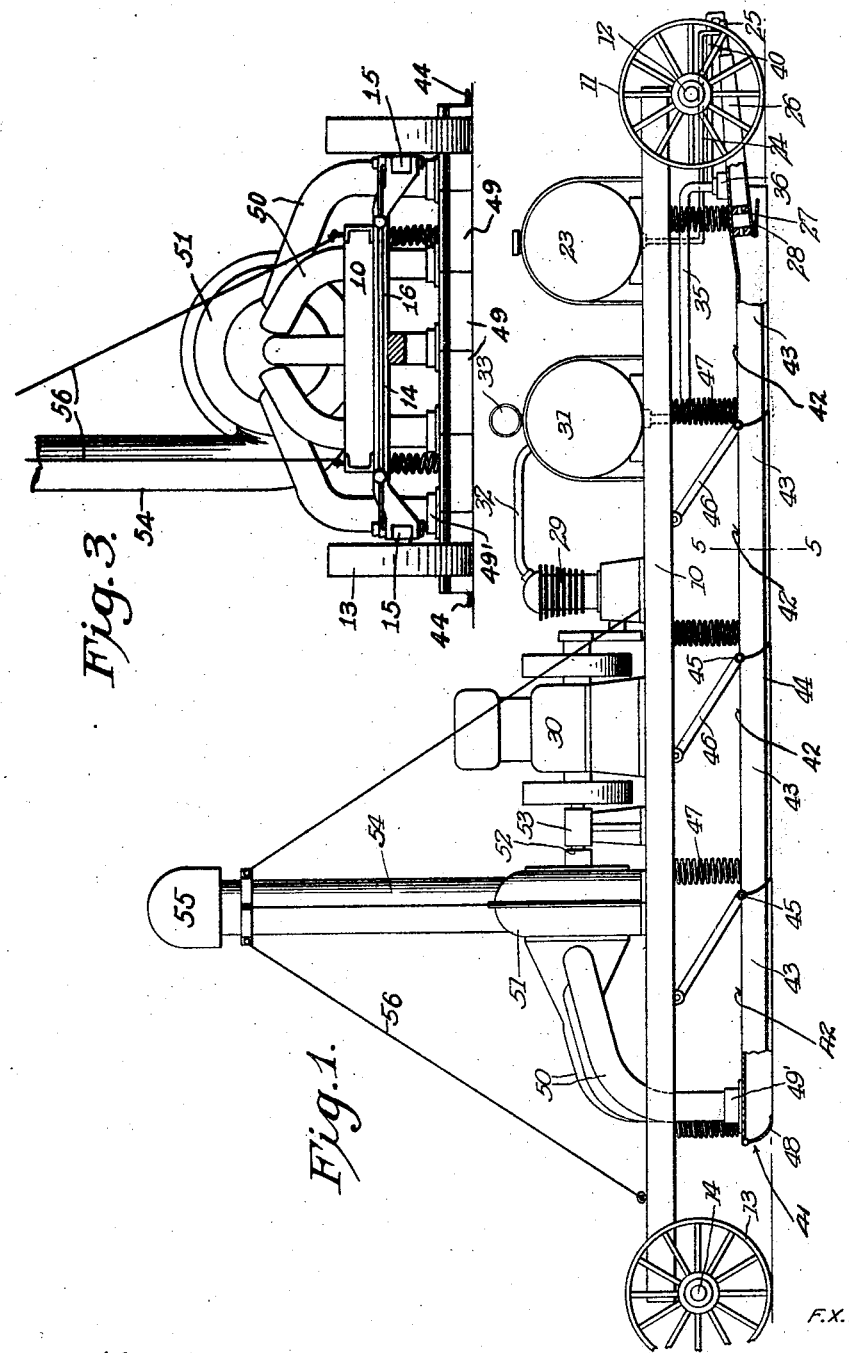
F. X. Bélanger
INVENTOR Feb. 2, 1926.
F. X. BÉLANGER
1,571,883
LAND CLEANING DEVICE
Original Filed Feb. 14, 1922    2 Sheets-Sheet 2
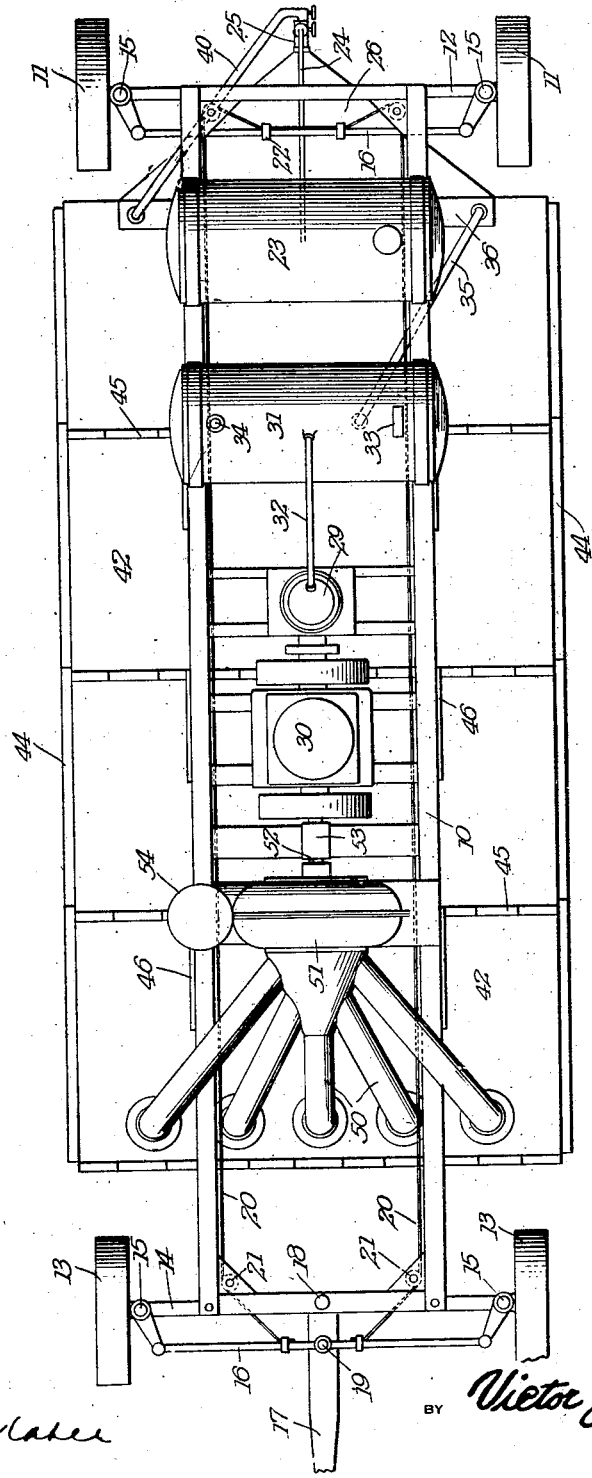
F. X. Bélanger,
INVENTOR
BY Victor J. Evans
ATTORNEY Patented Feb. 2, 1926.

1,571,883

UNITED STATES PATENT OFFICE.

FRANÇOIS X. BÉLANGER, OF LANGDON, NORTH DAKOTA.

LAND-CLEANING DEVICE.

Application filed February 14, 1922, Serial No. 536,575. Renewed November 24, 1925.

*To all whom it may concern:*

Be it known that I, FRANÇOIS X. BÉ-LANGER, a citizen of the United States, residing at Langdon, in the county of Cavalier and State of North Dakota, have invented new and useful Improvements in Land-Cleaning Devices, of which the following is a specification.

This invention relates to agricultural machines and has for an object the provision of a machine for removing and destroying stalks and seed of the vegetation, which is injurious to growing crops.

Another object of the invention is the provision of a machine for the above purpose, which may be moved over the surface of the ground either by horse or mechanical power, for the purpose above stated, and which to this end, will spread a fine sheet of flame over the surface of the ground and thereby destroy all injurious matter without damage to the soil.

With the above and other objects in view, the invention further includes the following novel features and details of construction, to be hereinafter more fully described, illustrated in the accompanying drawings and pointed out in the appended claims.

In the drawings:—

Figure 1 is a side elevation of a machine constructed in accordance with the present invention.

Figure 2 is a top plan view of the same.

Figure 3 is a front elevation.

Referring in detail to the drawings, wherein like characters of reference denote corresponding parts, the reference character 10 indicates the machine frame which is supported upon rear wheels 11, mounted upon an axle 12 and front wheels 13, mounted upon an axle 14. Each of the wheels 11 and 13 are connected to their respective axles by steering knuckles 15, which are in turn connected by a reduced rod 16. The rod 16 connected with the front wheels 13 is connected to a steering bar or tongue 17, which is pivotally connected to the axle 14 as shown at 18 and to the rod 16 as indicated at 19. The front wheels 13 are thus operated to control the direction of travel of the machine. For the purpose of simultaneously controlling the rear wheels 11 whereby to permit the machine to be turned in a restricted area flexible elements 20 are connected with the rods 16 of each of the axles 12 and 14 respectively. These cables are connected to the rod 16 upon opposite sides of the tongue 17, with one of the said cables passing rearwardly upon each side of the machine over guide pulleys 21 secured to the frame near the front and rear ends thereof. The rear ends of the cables 20 are connected to the rear connecting rod 16 at 22. Any desired means may be provided for moving the machine, such as either mechanical or horse power, the tongue 17 providing means whereby the machine may be coupled to its motive power.

Mounted upon the frame of the machine is a fuel tank 23, which is connected by means of a fuel supply pipe 24 with a fuel vaporizer 25. This vaporizer is located at the inner end of a spreader 26, whose opposite end is provided with a flared mouth having a burner 27 extending thereacross. The mouth of the spreader 26 is provided with a damper or shutter 28 for controlling the flame of the burner.

Also mounted on the frame 10 is an air compressor 29 which may be operated by any desired means, preferably a hydrocarbon engine 30, the fuel of which may consist of crude oil or low test kerosene so as to provide for economy of operation.

The air compressor 29 supplies air under pressure to a storage tank 31 through a pipe 32 and this tank is equipped with a pressure gauge 33 and a safety valve 34. The tank 31 supplies air through a pipe 35 to a pre-heater 36 which is positioned upon the spreader 26 in juxtaposition to the burner 27. This pre-heated air is conveyed to the vaporizer through a pipe 40.

Located beneath the frame of the machine between the wheels 11 and 13 is a flame passage or channel 41. This flame passage or channel is of a flexible construction and for this purpose is formed of sections 42 which extend transversely beneath the machine and which are provided with side flanges 43, the latter having laterally extending flanges 44 upon each side thereof and slightly spaced from the lower edges of the flanges 43 so as to limit the degree to which the said flanges 43 will enter the soil. The sections 42 are hingedly connected together as indicated at 45 and also connected to the machine frame 10 by arms 46. One end of these arms is pivotally connected to the frame and the opposite ends to the sections 42 so as to permit of independent vertical movement of the sections. Each section is yieldingly held in contact with the ground by means of springs 47. Thus a continuous passage or channel is formed beneath the machine and arranged so that the spreader 26 and its burner 27 will be disposed within the rear entrance of the said channel or passage.

By the use of the flame producing means just described, an intensely hot flame will be projected into the rear end of the flame passage of channel 41, being forced in a direction toward the front end of the machine and confined within the said passage or channel by the said flanges 43 of the channel sections 42.

The foremost channel section 42 is provided with a downwardly extending wall 48, whose lower edge contacts with the surface of the ground and in order to maintain a close contact with the ground, this wall 48 is formed in separate hinged sections 49, so that one section may pass over an elevation or obstruction without moving the remaining sections.

Communicating with the forward channel section 42 as shown at 49', are the lower ends of a plurality of flexible suction pipes 50. The opposite ends of these pipes are connected to the casing of a suction fan 51, whose shaft 52 is mounted in a bearing 53 and driven from the engine 30. A discharge stack 54 extends upwardly from the casing fan 51 and is provided with a cap 55. Guy wires 56 connecting the discharge stack with the machine frame serve to steady the former.

By means of the suction created by the fan 51, the flame will be drawn along the passage or channel 41 the entire length of the same and thus provide a flame sheet confined within and whose area is substantially the same as the area of the said passage or channel.

The invention is susceptible of various changes in its form, proportions and minor details of construction and the right is herein reserved to make such changes as properly fall within the scope of the appended claims.

Having described the invention what is claimed is:—

1. A land cleaning machine embodying a wheel supported frame, means carried by the frame for producing a flame at one end of the machine, an open bottom flame passage extending longitudinally beneath the machine, said passage being formed of separate sections and each section including downwardly extending side flanges, hinges connecting the sections, a closure wall at the forward end of the channel, means for yieldingly holding the sections in contact with the ground and means for directing a flame through said passage.

2. An apparatus of the character described comprising a wheeled frame, a flame confining chamber including a plurality of sections extending transversely across the bottom of the frame and hingedly connected together and including marginal flanges to be brought into close relation with the ground, resilient means urging the sections into contact with the ground, and means for creating a flame within the flame confining chamber.

In testimony whereof I affix my signature.

FRANÇOIS X. BÉLANGER.